(12) United States Patent
Bolz et al.

(10) Patent No.: US 9,382,890 B2
(45) Date of Patent: Jul. 5, 2016

(54) TUBULAR PRESSURE ACCUMULATOR, IN PARTICULAR FOR MIXTURE-COMPRESSING, SPARK-IGNITED INTERNAL COMBUSTION ENGINES

(75) Inventors: Thilo Bolz, Kraichtal (DE); Klaus Lang, Stuttgart (DE); Daniel Haverland, Stuttgart (DE); Norbert Schierholz, Markgroeningen (DE); Heiko Gruschwitz, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 358 days.

(21) Appl. No.: 13/996,627

(22) PCT Filed: Nov. 4, 2011

(86) PCT No.: PCT/EP2011/069430
§ 371 (c)(1),
(2), (4) Date: Aug. 16, 2013

(87) PCT Pub. No.: WO2012/084326
PCT Pub. Date: Jun. 28, 2012

(65) Prior Publication Data
US 2013/0319375 A1 Dec. 5, 2013

(30) Foreign Application Priority Data
Dec. 23, 2010 (DE) .......................... 10 2010 064 021

(51) Int. Cl.
*F02M 69/46* (2006.01)
*F02M 69/50* (2006.01)
(Continued)

(52) U.S. Cl.
CPC ................ *F02M 69/50* (2013.01); *B21C 37/08* (2013.01); *B21C 37/0803* (2013.01);
(Continued)

(58) Field of Classification Search
CPC ... F02M 69/50; F02M 69/465; F02M 55/025; F02M 2200/0853; F02M 2200/8084; B21C 37/157; B21C 37/08; B21C 37/0803; B23K 31/027; B23K 2201/006; B23K 2201/04
USPC .................................. 123/447, 456; 138/109
See application file for complete search history.

(56) References Cited

U.S. PATENT DOCUMENTS

| 7,146,700 | B1 | 12/2006 | Darrah et al. |
| 2005/0133008 | A1 | 6/2005 | Zdroik et al. |
| 2008/0156299 | A1 | 7/2008 | Sebastian et al. |
| 2014/0261840 | A1* | 9/2014 | Kadoma ................. 138/109 |

FOREIGN PATENT DOCUMENTS

| CN | 1497164 A | 5/2004 |
| CN | 101506512 A | 8/2009 |

(Continued)

OTHER PUBLICATIONS

International Search Report, PCT International Application No. PCT/EP2011/069430, dated Feb. 7, 2012.

*Primary Examiner* — Hai Huynh
(74) *Attorney, Agent, or Firm* — Norton Rose Fulbright US LLP

(57) ABSTRACT

A tubular pressure accumulator which is used, in particular, as a fuel distribution rail for a mixture-compressing, spark-ignited internal combustion engine includes a tubularly bent metal wall. In this way, longitudinal sides, which are assigned to one another, of tubularly bent metal wall are connected to one another through a weld. Furthermore, the tubularly bent metal wall has at least one design feature implemented by the machining of the flat metal wall and the bending of metal wall, which take place prior to the welding.

11 Claims, 4 Drawing Sheets

(51) Int. Cl.
*B21C 37/08* (2006.01)
*B21C 37/15* (2006.01)
*B23K 31/02* (2006.01)
*F02M 55/02* (2006.01)

(52) U.S. Cl.
CPC ............ *B21C 37/157* (2013.01); *B23K 31/027* (2013.01); *F02M 55/025* (2013.01); *F02M 69/465* (2013.01); *B23K 2201/006* (2013.01); *B23K 2201/04* (2013.01); *F02M 2200/8053* (2013.01); *F02M 2200/8084* (2013.01)

(56) References Cited

FOREIGN PATENT DOCUMENTS

| | | | |
|---|---|---|---|
| DE | 10 2006 061 563 | 7/2008 | |
| JP | 52-125460 | * 4/1976 | ............ B21D 53/44 |
| JP | 52-125460 | * 10/1977 | ............ B21D 53/44 |
| WO | WO 96/06707 | 3/1996 | |
| WO | WO 2007/113317 | 10/2007 | |

* cited by examiner

TUBULAR PRESSURE ACCUMULATOR, IN PARTICULAR FOR MIXTURE-COMPRESSING, SPARK-IGNITED INTERNAL COMBUSTION ENGINES

FIELD

The present invention relates to a tubular pressure accumulator, in particular a fuel distribution rail which may be used for mixture-compressing, spark-ignited internal combustion engines.

BACKGROUND INFORMATION

In one embodiment of a tubular pressure accumulator, e.g., a high-pressure rail for the gasoline direct injection, seamless drawn tubes or welded tubes may be used. The welded tubes may be rolled from a semi-finished product in the shape of a belt or a sheet metal board and then welded along the longitudinal seam or welded obliquely circumferentially. After the welding procedure, the tube may be further machined as a semi-finished product at the manufacturer of the high-pressure rail, the cross holes and the ends of the tube being finished with the aid of additional processes, e.g., cutting or punching. The cross holes are, for example, used for hydraulically connecting an inlet, connecting lines, and injector cups. These bore holes may be punched and subsequently deburred. The subsequent deburring is complex, however. If the deburring is omitted for simplification and cost reasons, significant weak points remain, however, which result in the component weakening under pulsing internal pressure. If the deburring is omitted, the tube must be oversized to achieve the required component stability, which, in turn, results in higher costs, in particular higher material costs.

SUMMARY

An example tubular pressure accumulator according to the present invention may have the advantage that the manufacturability is improved and/or novel design features may be implemented. In particular, the tubular pressure accumulator of the present invention may be manufactured at reduced manufacturing costs by the manufacturing processes, such as cutting processes, being simplified and an optimized material design, in particular a thin-walled implementation, being possible.

When manufacturing the example tubular pressure accumulator, one or multiple design features may be introduced prior to the welding of the bent metal wall. Here, it is, however, also possible that one or multiple steps for further machining the tubular pressure accumulator take place subsequently, if necessary, i.e., after the welding, if advantageous. To simplify the manufacture and to reduce the production costs, the processes for implementing the design features may, however, also be advantageously modified in such a way that higher stresses are possible with regard to the implementation of the metal wall. This makes the tubular pressure accumulator suitable for higher stresses. Also, in the case of predefined minimum mechanical strength, the starting material for the metal wall may meet lower requirements, in particular have a thin-walled design, whereby the manufacturing costs are reduced also with regard to machining the welded metal tube.

It may be advantageous if the design feature is implemented by machining the at least generally flat metal wall and by bending the flat metal wall into the tubularly bent metal wall. In this case, at least one design feature is implemented in this way. However, insofar that this is advantageous, preferably all or almost all design features are already implemented in the flat metal wall so that finishing is not necessary or is necessary only to a small extent.

Moreover, it may be advantageous if a design feature implemented by the machining of the metal wall and the bending of the metal wall, which take place prior to the welding, is a bore hole which is deburred on an inside of the bent and welded metal wall. In one conventional embodiment of a bore hole, a burr is formed on the inner surface of the tube by machining the welded or drawn tube. In this case, the deburring is accordingly complex. If the bore hole is implemented in the flat metal wall, for example, the deburring may, in contrast, take place in an extremely simple manner. Another possibility is that the bore holes and the like are preferably implemented in one direction through the flat metal wall. The metal wall may then be bent in such a way that the burrs are situated on the outer surface of the bent and welded metal wall, while the inner surface is burr-free. Therefore, a burr-free inner surface may be implemented without deburring. This has the advantage that burrs which are, in particular, provided on the inner surface and considerably reduce the stability, are omitted in the first place and the burrs remain on the less problematic outer surface. In particular, by punching on the belt, it is possible to achieve by automatic feeding a burr-free state on one side, which is then inside in the bent state, while the burr generated during punching is formed on the other side and possibly remains there. If this is advantageous, deburring may even be carried out at a later point in time with less effort than is the case on the inner surface. Depending on the embodiment, the design feature implemented by the machining of the metal wall and the bending of the metal wall, which take place prior to the welding, may have the burr on the outer surface of the bent and welded metal wall or the design feature is deburred on both sides and is, in particular, formed by a bore hole which is deburred on both sides.

Moreover, it may be advantageous if a design feature implemented by the machining of the metal wall and the bending of the metal wall, which take place prior to the welding, is a bore hole which has an opening angle predefined by the bending radius of the bending of the metal wall with regard to a peripheral direction. In this way, an at least approximately conical design of the bore hole may be implemented. For this purpose, it is possible in a simple manner to implement a cylinder-shaped bore hole in the flat metal wall which obtains the (partially) conical design through the bending procedure.

Furthermore, it may be advantageous if a design feature implemented by the machining of the metal wall and the bending of the metal wall, which take place prior to the welding, is a continuous recess which has an expanded cross section at least on an inner surface of the bent and welded metal wall. It is particularly advantageous when this design feature is implemented by a stepped bore introduced into the flat metal wall and by bending the flat metal wall into the tubularly bent metal wall. In this way, design features may be implemented which are virtually not possible when machining a drawn or welded tube.

Moreover, it may be advantageous if a design feature implemented by the machining of the metal wall and the bending of the metal wall, which take place prior to the welding, is a flattening or a through-hole. In this case, the flattening or the through-hole may be implemented by machining the flat metal wall on one or both side(s). In particular, it is possible that the flat metal wall is put on a support when being machined. Thus, these design features may be implemented more easily, which is not possible or possible only with a disproportionately great effort when finishing a drawn or welded tube.

Moreover, it may be advantageous if a design feature implemented by the machining of the metal wall and the bending of the metal wall, which take place prior to the welding, is an elongated hole, an elongated hole having expanded ends, or an O-shaped elongated hole. Here, multiple such design features may be provided on a single tubular pressure accumulator. In this way, a large number of possible connections may be implemented. By punching in a flat metal sheet, geometries may also be implemented which are not implementable or are only implementable with great effort in a welded or drawn tube. In particular, stress-optimized geometries may be implemented.

It may also be advantageous if the weld is situated in an area of the bent and welded metal wall which is least stressed mechanically. By machining the flat metal wall, machining steps, in particular cutting or punching, may be carried out largely independently of the position of the later weld. This also makes it possible that the configuration of the design features is selected in the flat metal wall with regard to the position of the weld implemented later in such a way that the weld is placed in the area which is least stressed mechanically. Moreover, the additional effort in the later process, which would otherwise be required by the weld orientation, may be reduced by the targeted assignment of the design features, e.g., cross holes, to the later weld.

BRIEF DESCRIPTION OF THE DRAWINGS

Preferred exemplary embodiments of the present invention are explained in greater detail below based on the figures in which corresponding elements are provided with matching reference numerals.

DETAILED DESCRIPTION OF EXAMPLE EMBODIMENTS

Figure 1:
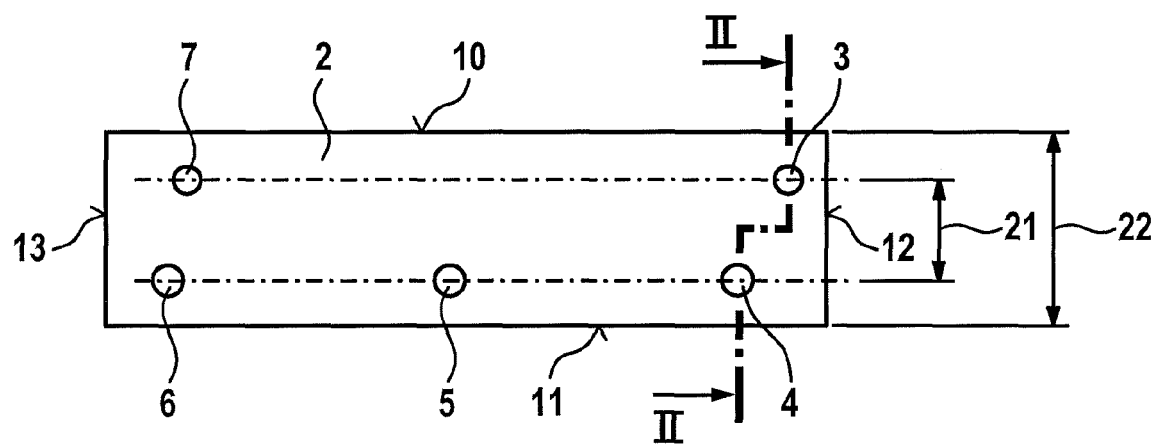
FIG. 1 shows a flat metal wall for implementing a tubular pressure accumulator in one schematic illustration according to one exemplary embodiment of the present invention.
Figure 2:
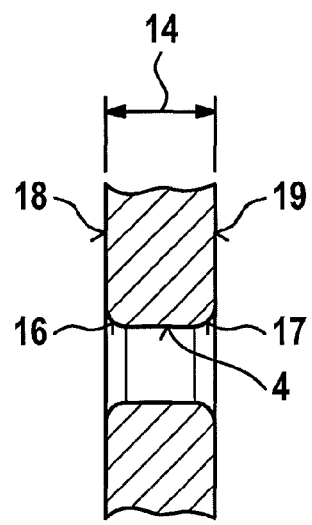
FIG. 2 shows a schematic section through the flat metal wall illustrated in FIG. 1 according to the exemplary embodiment of the present invention.
Figure 3:
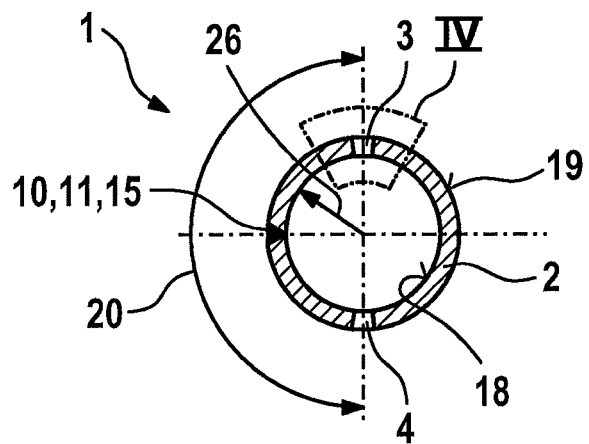
FIG. 3 shows the metal wall illustrated in FIG. 1 along the intersecting line denoted with reference numeral II in a bent and welded state for implementing the tubular pressure accumulator according to the exemplary embodiment of the present invention.

FIG. 1, FIG. 2, and FIG. 3 illustrate an implementation of a tubular pressure accumulator 1 of a first exemplary embodiment of the present invention. Here, FIG. 1 shows a flat metal wall 2 in a schematic illustration. FIG. 2 shows a schematic section along the intersecting line denoted with reference numeral II in FIG. 1 in a schematic illustration. FIG. 3 shows tubular pressure accumulator 1 which includes bent and welded metal wall 2. The particular design of tubular pressure accumulator 1 of the exemplary embodiment is due to the sequence of machining steps of metal wall 2. Tubular pressure accumulator 1 is, in particular, suitable as a fuel distribution rail for a fuel injection system of an internal combustion engine. In particular, tubular pressure accumulator 1 may be used as a fuel distribution rail for mixture-compressing, spark-ignited internal combustion engines. However, tubular pressure accumulator 1 of the present invention is also suitable for other possible applications.

Flat metal wall 2, which is illustrated in FIG. 1, may be punched from a belt, a sheet metal board, or the like. For this purpose, design features 3, 4, 5, 6, 7 are introduced into metal wall 2 prior to, during, or after the punching. In this exemplary embodiment, design features are bore holes 3 through 7. Bore holes 3 through 7 may have different diameters. Design features 3 through 7 may, for example, be used to implement connecting points on tubular pressure accumulator 1.

Metal wall 2 has longitudinal sides 10, 11. Furthermore, metal wall 2 has front sides 12, 13. In the case of the flat implementation of metal wall 2, longitudinal sides 10, 11 initially face away from each other. Metal wall 2 is then bent into a tube. Longitudinal sides 10, 11 come in contact with each other due to impact, for example. A certain degree of overlapping as a function of a material strength 14 of metal wall 2 in the area of longitudinal sides 10, 11 may, however, be meaningful. In the area of longitudinal sides 10, 11, a connection through a weld 15 is carried out via welding. In this way, longitudinal sides 10, 11 of tubularly bent metal wall 2 are connected to one another through the weld. Since the two longitudinal sides 10, 11 come in contact with each other due to the bending, longitudinal sides 10, 11 are assigned to one another.

As illustrated in FIG. 2, bore hole 4 may, for example, be implemented and machined in a simple manner prior to the bending. In particular, both sides may be deburred already during the punching of bore hole 4 with the aid of chamfers 16, 17. In the bent state, one side 18 of flat metal wall 2 becomes inner surface 18 of bent metal wall 2. Accordingly, in the bent state, one side 19 becomes outer surface 19 of bent metal wall 2.

Since burrs or the like have a negative effect, in particular, on inner surface 18 with regard to the stability of tubular pressure accumulator 1, design features 3 through 7 are preferably deburred at least on side 18. It is also possible that during the implementation of design features 3 through 7, a machining direction is selected in such a way that the burrs form on outer surface 19 in a targeted manner, while a burr formation on inner surface 18 does not occur at all due to the type of machining. Such an implementation is explained in greater detail with reference to FIG. 6.

FIG. 3 shows tubular pressure accumulator 1 in a schematic sectional illustration along the intersecting line denoted with reference numeral II in FIG. 1. The implementation of the tubular pressure accumulator having design features 3 through 7 results in this case from machined flat metal wall 2, on the one hand, and from bending and subsequent welding, on the other hand. According to the section along the intersecting line denoted with reference to numeral II in FIG. 1, design features 3, 4 are illustrated in the form of bore holes 3, 4 in FIG. 3. An angle 20 which, in this exemplary embodiment, is equal to 180° results in this case from a distance 21 between the central points of the two design features 3, 4 with regard to a width 22 of flat metal wall 2 which is identical to the distance between the two longitudinal sides 10, 11 of flat metal wall 2. A possibly necessary overlapping is included in the calculation. Moreover, a positioning of design features 3 through 7 in relation to weld 15 is made possible due to the already known position of weld 15 which will namely form on longitudinal sides 10, 11 of flat metal wall 2 after the bending. In this way, the positions of individual design features 3 through 7 among each other and the position of weld 15 may be predefined almost arbitrarily. In particular, weld 15 may always be placed in the area of tubular pressure accumulator 1 which experiences the least stress.

Moreover, the manufacture is simplified, since design features 3 through 7 are established in advance with regard to longitudinal sides 10, 11 and thus with regard to later weld 15. During a manufacturing process in which bore holes or the like are subsequently introduced into the welded tube, there is namely the problem that the weld must be oriented in a targeted manner so that bore holes are spaced at a certain minimum distance therefrom, for example.

Figure 4:
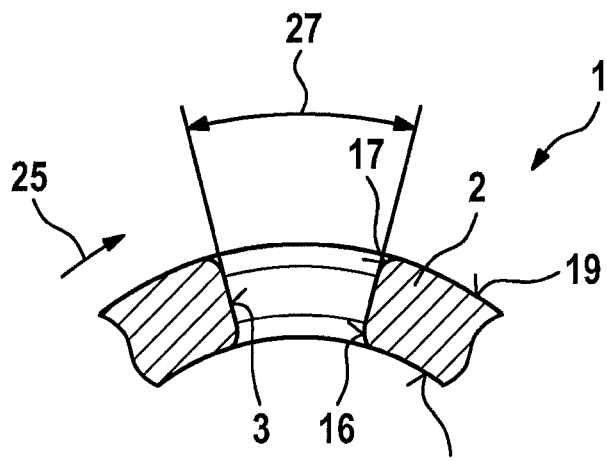
FIG. 4 shows the section of a tubular pressure accumulator denoted with reference numeral IV in FIG. 3 according to a second exemplary embodiment of the present invention.

FIG. 4 shows the section of tubular pressure accumulator 1 denoted with reference numeral IV in FIG. 3 according to a second exemplary embodiment. In this exemplary embodiment, design feature 3 implemented as bore hole 3 is implemented through an initially cylinder-shaped bore hole 3. Furthermore, chamfers 16, 17 are provided for deburring on both sides. By bending metal wall 2 into a hollow cylinder-shaped geometry having a ring-shaped cross section, as also illustrated in FIG. 3, bore hole 3 obtains an opening angle 27, which is predefined by bending radius 26 (FIG. 3) of the bending of metal wall 2, with regard to a circumferential direction 25. In this way, a (partially) conical implementation of bore hole 3 is achieved.

Figure 5:
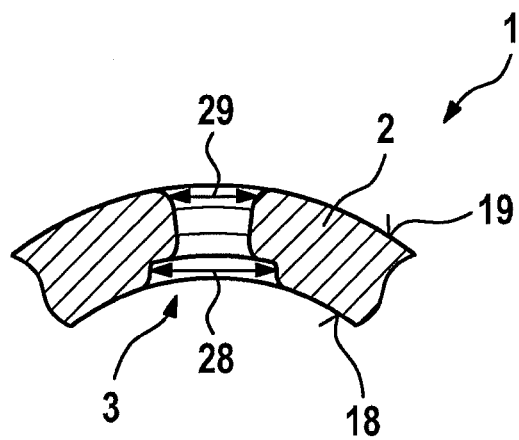
FIG. 5 shows the section of a tubular pressure accumulator denoted with reference numeral IV in FIG. 3 according to a third exemplary embodiment of the present invention.

FIG. 5 shows the section of tubular pressure accumulator 1 denoted with reference numeral IV in FIG. 3 according to a third exemplary embodiment. In this exemplary embodiment, design feature 3 implemented by the machining of metal wall 2 and the bending of metal wall 2, which take place prior to the welding, is a continuous recess 3 having an expanded cross section 28 on inner surface 18. In this exemplary embodiment, recess 3 also has an expanded cross section 29 on outer surface 19. Design feature 3 may in this case be implemented by a stepped bore 3 introduced into the flat metal wall 2 and by bending the flat metal wall 2 into tubularly bent metal wall 2. In this way, constructive configurations of design feature 3 may be implemented, in particular, on inner surface 18 with relatively little effort, since they are already carried out on metal wall 2 while it is still flat.

Figure 6:
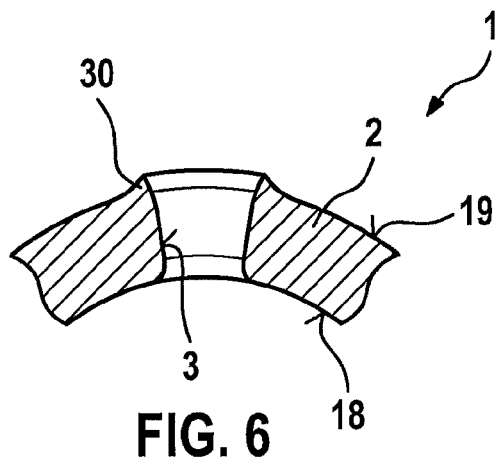
FIG. 6 shows the section of a tubular pressure accumulator denoted with reference numeral IV in FIG. 3 according to a fourth exemplary embodiment of the present invention.

FIG. 6 shows the section of tubular pressure accumulator 1 denoted with reference numeral IV in FIG. 3 according to a fourth exemplary embodiment. In this exemplary embodiment, design feature 3, e.g., a bore hole 3, is introduced into flat metal wall 2 in such a way that a burr 30 is formed naturally on outer surface 19, while inner surface 18 remains burr-free. For this purpose, it is already established on flat metal wall 2 that side 18 is the inner surface after the bending, while side 19 is accordingly outer surface 19 after the bending. With the aid of this establishment, all design features 3 through 7 may be implemented in such a way that no burr is formed on inner surface 18 or at least that a burr is not pronounced. If necessary, individual design features 3 through 7 may be deburred on inner surface 18 and/or outer surface 19, which preferably already takes place on metal wall 2 while it is still flat. In this embodiment, in particular, the geometries may be implemented by punching, and thus very cost-effectively, in the flat metal sheet or the like.

Figure 7:
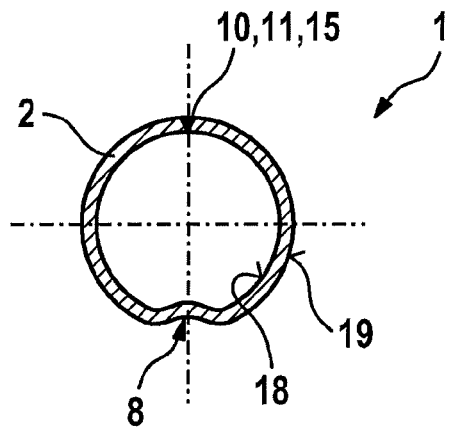
FIG. 7 shows the section through a tubular pressure accumulator illustrated in FIG. 3 according to a fifth exemplary embodiment of the present invention.

FIG. 7 shows the section of tubular pressure accumulator 1 denoted with reference numeral IV in FIG. 3 according to a fifth exemplary embodiment. In this exemplary embodiment, a design feature 8 is provided which is implemented by the machining of flat metal wall 2 and the bending of metal wall 2, which take place prior to the welding. Here, design feature 8 is formed by the implementation of an indentation from side 19 to side 18 on flat metal wall 2 and subsequent bending and welding. Design feature 8 results after the bending and welding as a flattening on tubular pressure accumulator 1. Thus, it is possible to implement dimensioned flattenings, in particular flattening 8, on tubular pressure accumulator 1 in a targeted and precise manner.

Figure 8:
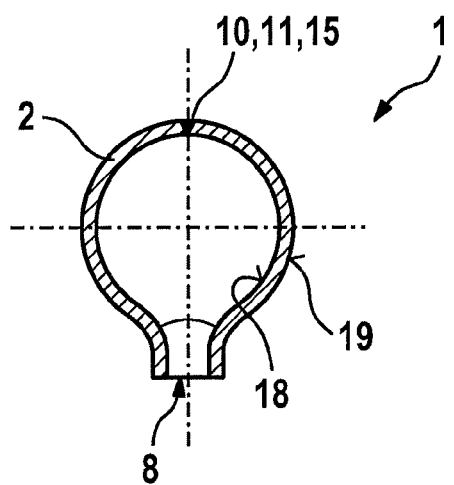
FIG. 8 shows the section through a tubular pressure accumulator illustrated in FIG. 3 according to a sixth exemplary embodiment of the present invention.

FIG. 8 shows the section through a tubular pressure accumulator 1 illustrated in FIG. 3 according to a sixth exemplary embodiment. In this exemplary embodiment, design feature 8 implemented by the machining of metal wall 2 and the bending of metal wall 2, which take place prior to the welding, is a through-hole 8. Such a through-hole 8 may be implemented relatively simply in metal wall 2 while it is still flat. In this way, such a geometrical design feature 8 may be implemented in a chip-free manner. Therefore, an additional component may be saved.

Figure 9:
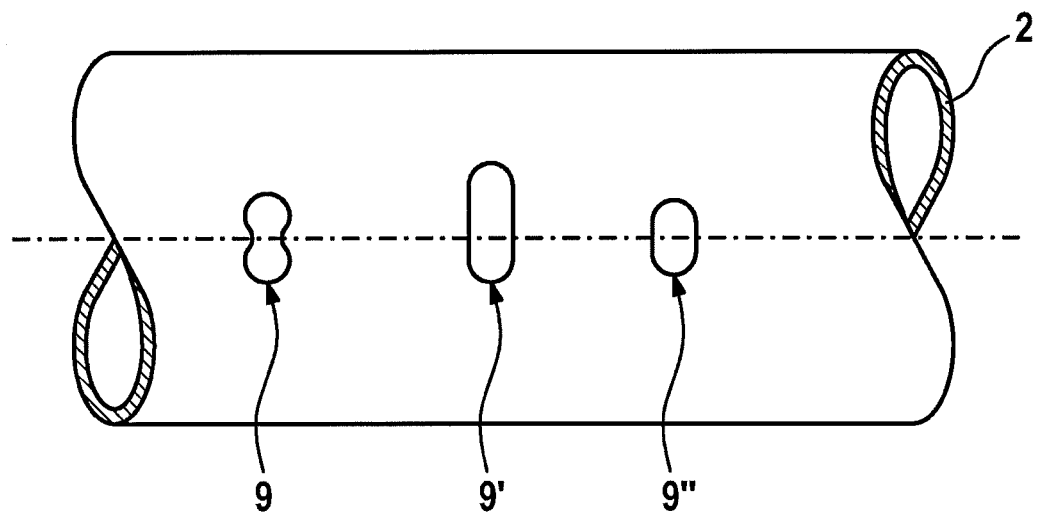
FIG. 9 shows a tubular pressure accumulator in a schematic illustration according to a seventh exemplary embodiment of the present invention.

FIG. 9 shows a tubular pressure accumulator 1 in a schematic illustration according to a seventh exemplary embodiment. Design features 9, 9', 9" are provided in this exemplary embodiment. Design feature 9 implemented by the machining of still flat metal wall 2 and the bending of the metal wall, which take place prior to the welding, is implemented as elongated hole 9 having expanded ends. Design features 9', 9" are also implemented by the machining of flat metal wall 2 and the bending of metal wall 2, which take place prior to the welding. Design feature 9' is implemented as an elongated hole 9'. Design feature 9" is implemented as an O-shaped elongated hole 9". Thus, complex design features 9, 9', 9" may also be implemented. This may advantageously take place by punching.

Therefore, tubular pressure accumulator 1 may have design features 3 through 7, 8, 9, 9', 9" according to one of the exemplary embodiments of the present invention, appropriate combinations of such design features 3 through 7, 8, 9, 9', 9" being possible with regard to the particular application. In this way, design features may also be implemented which are not implementable or are at least virtually not implementable when machining a drawn or welded tube. For example, a geometry, such as exterior burr 30 illustrated in FIG. 6, may not be implemented in a drawn or welded tube.

Figure 10:
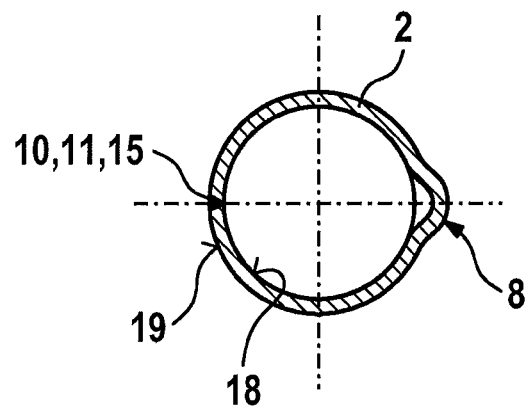
FIG. 10 shows the section of a tubular pressure accumulator denoted with reference numeral IV in FIG. 3 according to an eighth exemplary embodiment of the present invention.

FIG. 10 shows the section of a tubular pressure accumulator denoted with reference numeral IV in FIG. 3 according to an eighth exemplary embodiment of the present invention. In this exemplary embodiment, design feature 8 is a dome-shaped geometry 8. By machining metal wall 2 in its flat state, such design features 8 may be implemented on the metal wall in a simple manner. In this case, a targeted local machining is, in particular, possible. It is thus also possible that a design feature 8 implemented by the machining of metal wall 2 and the bending of metal wall 2, which take place prior to the welding, is a dome-shaped geometry 8, in particular a bulge-shaped elevation 8.

The present invention is not limited to the described exemplary embodiments.

What is claimed is:

1. A tubular pressure accumulator, comprising:
a tubularly bent metal wall, longitudinal sides, which are assigned to each other, of the tubularly bent metal wall being connected to one another through at least one weld, the tubularly bent metal wall having at least one design feature implemented by machining a flat metal wall and bending the flat metal wall into the tubularly bent metal wall, which take place prior to the welding, wherein the tubular pressure accumulator is a fuel distribution rail for a mixture-compressing, spark-ignited internal combustion engine.

2. The tubular pressure accumulator as recited in claim 1, wherein the design feature is implemented by machining the flat metal wall and by bending the flat metal wall into the tubularly bent metal wall.

3. The tubular pressure accumulator as recited in claim 1, wherein at least one of: i) the design feature implemented by the machining of the metal wall and the bending of the metal wall, which take place prior to the welding, is a bore hole which is deburred on an inner surface of the bent and welded metal wall, and ii) the design feature implemented by the machining of the metal wall and the bending of the metal wall, which take place prior to the welding, is a bore hole which is deburred on both sides.

4. The tubular pressure accumulator as recited in claim 1, wherein the design features implemented by the machining of the metal wall and the bending of the metal wall which take place prior to the welding, is a bore hole which has an opening angle predefined by the bending radius of a bending of the metal wall with regard to a circumferential direction.

5. The tubular pressure accumulator as recited in claim 1, wherein at least one of: i) the design feature implemented by the machining of the metal wall and the bending of the metal wall, which take place prior to the welding, is a continuous recess which has an expanded cross section at least on an inner surface of the bent and welded metal wall, and ii) the design feature is implemented by a stepped bore introduced into the flat metal wall and by bending the flat metal wall into the tubularly bent metal wall.

6. The tubular pressure accumulator as recited in claim 1, wherein the design feature implemented by the machining of the metal wall and the bending of the metal wall, which take place prior to the welding, has a burr on an outer surface of the bent and welded metal wall.

7. The tubular pressure accumulator as recited in claim 1, wherein the design feature implemented by the machining of the metal wall and the bending of the metal wall, which take place prior to the welding, is a flattening.

8. The tubular pressure accumulator as recited in claim 1, wherein the design feature implemented by the machining of the metal wall and the bending of the metal wall, which take place prior to the welding, is a through-hole.

9. The tubular pressure accumulator as recited in claim 1, wherein the design feature implemented by the machining of the metal wall and the bending of the metal wall, which take place prior to the welding, is a dome-shaped geometry, the dome-shaped geometry having a bulge-shaped elevation.

10. The tubular pressure accumulator as recited in claim 1, wherein at least one of: i) the design feature implemented by the machining of the metal wall and the bending of the metal wall, which take place prior to the welding, is an elongated hole, the design feature implemented by the machining of the metal wall and the bending of the metal wall, which take place prior to the welding, is an elongated hole having expanded ends, and ii) the design feature implemented by the machining of the metal wall and the bending of the metal wall, which take place prior to the welding, is an O-shaped elongated hole.

11. The tubular pressure accumulator as recited in claim 1, wherein the weld is situated in an area of the bent and welded metal wall which is least stressed mechanically.

* * * * *